Oct. 7, 1947.    A. G. COLE    2,428,652
PIPE COUPLING
Filed April 28, 1945    2 Sheets-Sheet 1

Oct. 7, 1947.　　　A. G. COLE　　　2,428,652
PIPE COUPLING
Filed April 28, 1945　　　2 Sheets-Sheet 2

INVENTOR.
Archie F. Cole
BY
his attorney

Patented Oct. 7, 1947

2,428,652

UNITED STATES PATENT OFFICE 2,428,652

PIPE COUPLING

Archie G. Cole, Gilbertsville, Ky.

Application April 28, 1945, Serial No. 590,903

5 Claims. (Cl. 285—90)

The invention pertains to a pipe coupling and more particularly to a quickly or readily releasable connection between sections of piping employed in hydraulic dredging operations. The average hydraulic dredging operation necessitates the use of a discharge or conveyor line which, in not unusual instances, approximates or exceeds a thousand feet or more. Further, the discharge pipe utilized in hydraulic dredging operations has certain portions thereof carried by pontoons and the latter, except in rare instances, when the water in which the pontoons float is exceptionally quiet, varies constantly and considerably with respect to one another in vertical and horizontal directions. It will be appreciated, therefore, that for the floating portion of the discharge line at least, it is highly desirable for the success of the dredging operation, that this portion of the line be provided with connections of the type which will be sufficiently flexible as to readily compensate for the varying relationship of the supporting pontoons. Heretofore the floating pipe sections have been connected by means of heavy and expensive metallic ball and socket joints. This type of connection, while in wide use, is not entirely satisfactory in actual practice due to the abrasive action of sand, gravel and other foreign substances passing through the pipe and tending to wear the heavy collar or band welded in the ball and socket joint to protect the latter against abrasion. The rapid wear of the collar necessitates the continued replacement of the ball and socket joints and with the consequent shut down of the operation until a worn ball and socket joint can be replaced by another. The weight and bulkiness of the ball and socket joint renders this interchange a difficult and costly operation.

With the above, therefore, as a background, it may be now stated that an object of the invention is the provision of a flexible, adjustable, inexpensive and easily removable coupling for two sections of pipe employed as conveyors in a hydraulic dredging system or operation.

Another object of the invention is the provision of a coupling for a plurality of sections of piping with the coupling being so arranged and constructed that it may be easily and readily assembled, disassembled or replaced.

A feature of the invention is to provide a coupling for piping with the coupling having pin-connected hinged parts. An added feature of the invention is to provide a coupling adapted to connect metallic pipes with the coupling comprising a metallic member secured to a metallic pipe and removably secured hinged metallic members clamping a contiguous extremity of a flexible tube in a fixed predetermined position.

The above objects and features of the invention, as well as numerous others, will become apparent from the succeeding description considered together with the accompanying drawings, wherein.

Figure 1:
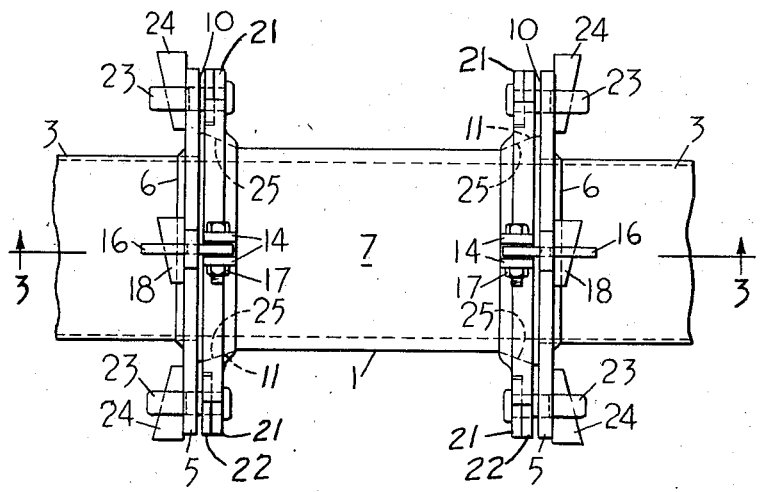
Figure 1 is a plan view of a pipe coupling embodying the present invention.

Referring now in detail to the drawings, wherein like reference characters refer to like parts, the numeral 1 is employed to designate, in a somewhat general manner, a section of piping of substantial and circular cross section adapted for use in a dredging operation wherein water, sand, gravel, etc., are conveyed from one location to another. While it will be appreciated that the present invention is primarily concerned with pipes or conduits of large proportions, it may equally be employed with piping of small cross section. The pipe coupling comprises two sections of metallic pipe 3 having associated ends 4 thereof spaced a predetermined distance apart with this distance controlled by the particular circumstances in each individual case. Each pipe has a ring-like disc, washer or end flange 5 sleeved over an end thereof to be disposed substantially flush with the end of the pipe. Rather than form the end flange in the nature of a machined and expensive collar threadedly secured to the pipe, each end flange, which presents a barrier or bulkhead, is secured to a related pipe section by means of a weld 6 to thus integrally unite the pipe and disc. Extending or bridging the space between associated and separated end flanges is a flexible tube, connection or nipple 7 formed preferably of rubber, rubber compound or any material which is inherently flexible or which may lend itself to bending stresses without becoming distorted to such a degree that a free flow of substance therethrough is thereby impeded. Because of the flexibility of the nipple, one section of the pipe may vary vertically or horizontally for a considerable extent with respect to another or adjacent section of pipe without interfering with the free unobstructed flow of material from one section to another. The interior diameter of the flexible nipple is preferably equal to the interior diameter of the metallic pipe so as to present no obstructions which will be worn away by the combination of water, sand, gravel, etc. flowing through the piping. It has been found in actual practice that any obstructions such as those which might be formed by exposed ends of the pipe not only are worn away in a relatively short operating period, to weaken the connection, but they also form means against which a dam will be built to obstruct the free flow of substance through the piping. For these reasons, therefore, it is preferred that the interior of the piping formed by the metallic and flexible members be of a constant interior diameter throughout their entire lengths.

Figure 2:
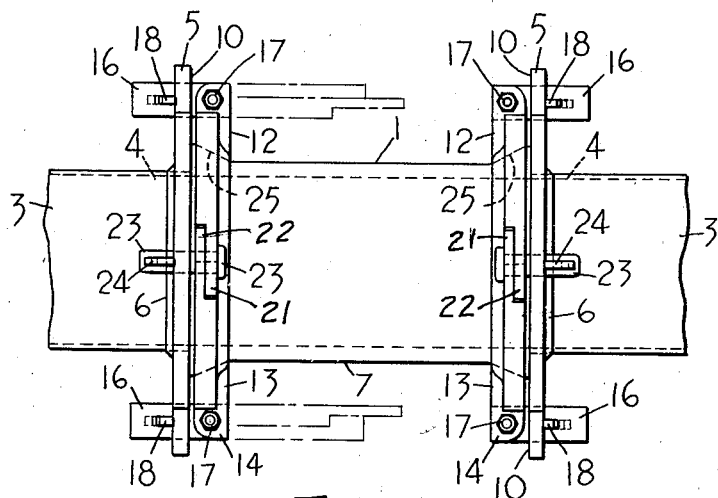
Figure 2 is a side elevational view of the coupling shown in Figure 1.
Figure 3:
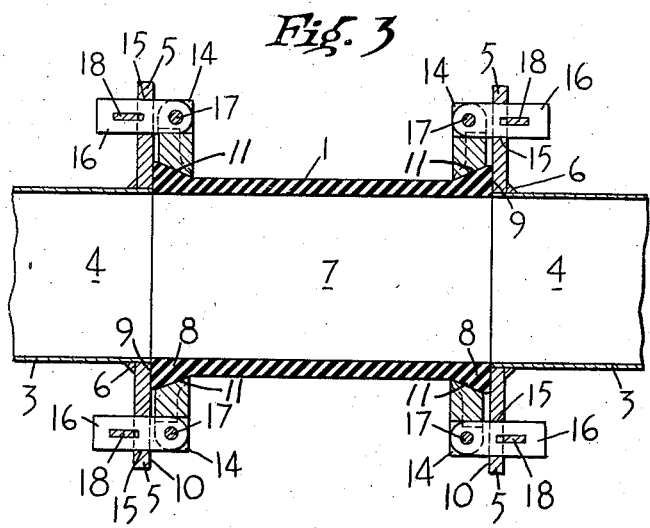
Figure 3 is a vertical sectional view taken along the lines 3—3 of Figure 1, looking in the direction of the arrows.
Figure 4:
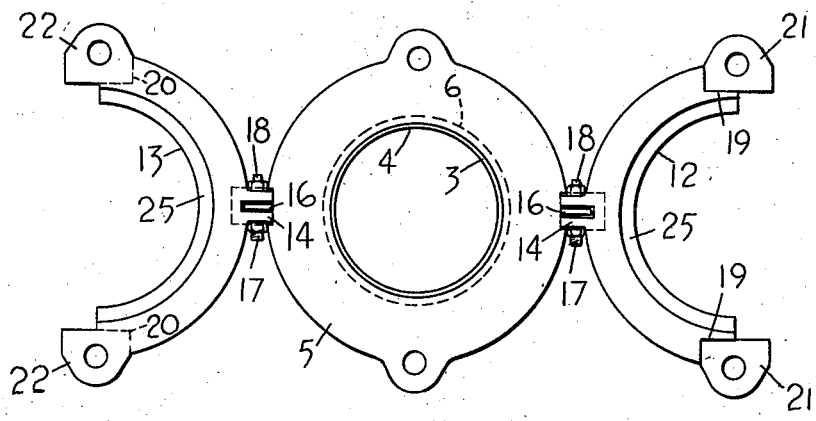
Figure 4 is an end elevational view of an assembly of some of the components of the pipe coupling with the components illustrated in an open or inoperative position.

The nipple has enlarged outwardly flared ends 8 each presenting a plane transverse end face 9 in surface bearing relation or in intimate contact with a related co-planar transverse surface 10 of an associated end flange so as to present a leak-proof seal between the nipple and adjacent section of pipe. Each nipple flared end has a circular outwardly tapering or outwardly flared, inclined surface 11 which, as will be hereinafter explained more in detail, forms an abutting or wedging surface. Associated with each end flange is a pair of substantially counterpart semi-circular yokes, clamping rings or split collars 12 and 13, with each yoke having outstanding therefrom intermediate its ends, radially disposed and outstanding, spaced, hinging lugs 14. The hinging lugs in an assembled structure extend radially for a distance slightly beyond the periphery of the related end flange as clearly indicated in Figures 2 and 4. Each washer is provided with a pair of diametrically disposed slots 15 which accommodate plate-like hinging straps 16, the latter of which bisect the washer and extend between adjacent hinging lugs. Bolts 17 or any other securing means are threaded through aligned apertures in the hinging lugs and straps to pivotally secure the yokes to the end flanges. On a side of the end flanges removed from the yokes the hinging straps are provided with tapered keys 18 which may be driven in place to draw the intermediate portions of the yokes toward the end flanges and also thereby present a quickly removable means for effecting a partial separation of the yokes and end flanges. The extremities of the clamping ring 12 are undercut as at 19 while the free ends of the clamping ring 13 are countersunk as at 20 with the ends of the clamping rings at these locations extended as a reduced section radially or in an outward direction to present overlapping clamping ears 21 and 22, respectively. In an assembled relation, the ears 21 overlie the ears 22, with mated ears being superimposed one upon another so that a pair of clamping rings form a circular ring-like member. Extending through aligned apertures in each mated pair of ears is a headed bolt or pin 23 projecting through an accommodating aperture in the related end flange to be bisected by a wedge or key 24. Driving blows imparted to the keys 24 will draw the ends of the split collars toward the adjacent end flange. The pins 23 are diametrically disposed relative to one another and quadrantly spaced from the hinging straps. As will be apparent, any dislodging blow imparted to the keys 24 will result in the pins 23 being quickly removed to effect or permit a hinging action of the clamping rings about the bolts 17 in a direction away from the flexible nipple, as clearly indicated in Figures 2 and 4 of the drawings. Also as suggested in Figure 4 of the drawings, the flexible nipple can easily be removed from between two sections of pipe in a direction normal to a diametric line passing through the hinging straps, once the clamping rings are hinged to an inoperative position.

Each clamping ring or yoke has an inner flared or tapered surface 25 circular in formation and arranged to bear against an inclined surface 11 of the nipple. Any tightening action of the hinging straps and headed pins to shorten their effective lengths will result in the flared ends of the nipple being drawn into tight or firm engagement with the contiguous surface of the end flanges to present a readily dismountable, leak-proof seal between the metallic pipe and flexible nipple.

From the above it will be noted that various changes and alterations may be made to the illustrated and described construction without departing from within the spirit of the invention and scope of the appended claims.

I claim:

1. In a pipe coupling, the combination of a metallic pipe, a flange rigidly secured to said metallic pipe, a flexible tubular member having an enlarged end in abutting relation with said flange, a pair of yokes overlying said enlarged end of said tubular member and being hinged intermediate their ends to said flange, extremities of said yokes being disposed in overlapping relation, and means removably securing said overlapping extremities to said flange.

2. In a pipe coupling, the combination of a metallic pipe, a flange secured to said metallic pipe flush with an end thereof, a flexible tubular member having an inside diameter equal to the inside diameter of said metallic pipe, a flared end on said flexible tubular member in abutting relation with said flange, clamping means forming a continuous member overlying said flared end, means pivotally connecting said clamping means to said flange, and means spaced from said first named means connecting said clamping means to said flange.

3. In a pipe coupling, the combination of a metallic pipe, a flange secured to said metallic pipe flush with an end thereof, a flexible tubular member having an inside diameter equal to the inside diameter of said metallic pipe, a flared end on said flexible tubular member in abutting relation with said flange, clamping members overlying said flared end, diametrically disposed means pivotally connecting said clamping members to said flange, and oppositely disposed means connecting said clamping member to said flange; all of said means being adjustable so as to draw said clamping members toward said flange.

4. In a pipe coupling, the combination of a metallic pipe, a flange secured to said metallic pipe flush with an end thereof, a flexible rubber member having an inside diameter equal to the inside diameter of said pipe, a tapered enlarged end on said flexible rubber member in surface bearing relation with said flange, clamping members spaced from said flange and having inclined surfaces in engagement with said tapered enlarged end, and means connecting said clamping members to said flange.

5. In a pipe coupling, the combination of a metallic pipe, a flange secured to said pipe adjacent one end thereof, a flexible tubular member having an enlarged flared end portion in abutting relation with said flange, split collars spaced from said flange and having an inclined surface in bearing relation with said flared end portion, oppositely disposed means removably secured to said flange, hinging means pivotally securing said split collars to said first named means, and diametrically disposed means between said first named means removably securing said split collars to said flange.

ARCHIE G. COLE.

REFERENCES CITED

The following references are of record in the file of this patent:

UNITED STATES PATENTS

| Number | Name | Date |
|---|---|---|
| 946,396 | Phillips | Jan. 11, 1910 |
| 2,093,991 | Boyer | Sept. 28, 1937 |
| 2,291,709 | Goetze | Aug. 4, 1942 |